United States Patent [19]

Foster

[11] 4,096,449
[45] Jun. 20, 1978

[54] APPARATUS FOR PRODUCING AN ELECTRIC GLOW DISCHARGE IN A FLOWING GAS

[75] Inventor: Jack D. Foster, Los Altos, Calif.

[73] Assignee: Universal Laser Corp., Los Altos, Calif.

[21] Appl. No.: 759,461

[22] Filed: Jan. 14, 1977

[51] Int. Cl.² .............................................. H01S 3/097
[52] U.S. Cl. ...................... 331/94.5 PE; 331/94.5 D; 313/218
[58] Field of Search ................... 331/94.5 PE, 94.5 G, 331/94.5 D; 313/218, 311

[56] References Cited

U.S. PATENT DOCUMENTS

| 3,828,277 | 8/1974 | Otto et al. | 331/94.5 PE |
| 3,886,481 | 5/1975 | Foster et al. | 331/94.5 D |
| 3,935,547 | 1/1976 | Riemersma et al. | 331/94.5 PE |

Primary Examiner—William L. Sikes
Assistant Examiner—Marcus S. Rasco
Attorney, Agent, or Firm—Limbach, Limbach & Sutton

[57] ABSTRACT

Apparatus is described for producing an electric glow discharge in gas flowing along a channel with the discharge extending in a direction generally transverse to the flow, such apparatus including a first electrode disclosed adjacent a first wall of the flow channel and a generally planar second electrode disposed adjacent a second wall of the flow channel opposed to the first wall, the second electrode being formed of a material having a resistivity in the range of $10^2$ to $10^6$ ohm-centimeters. Means for electrically energizing the first and second electrodes to establish the glow discharge are also provided.

9 Claims, 4 Drawing Figures

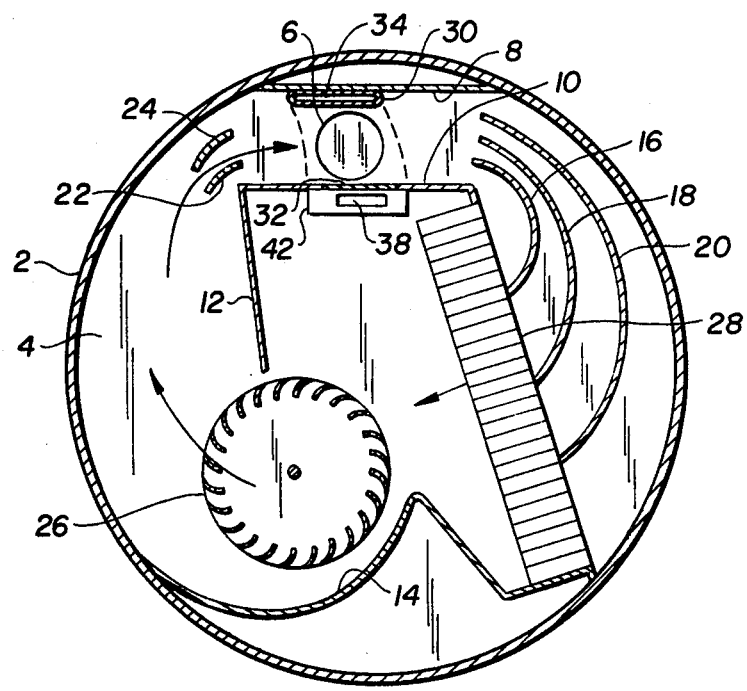
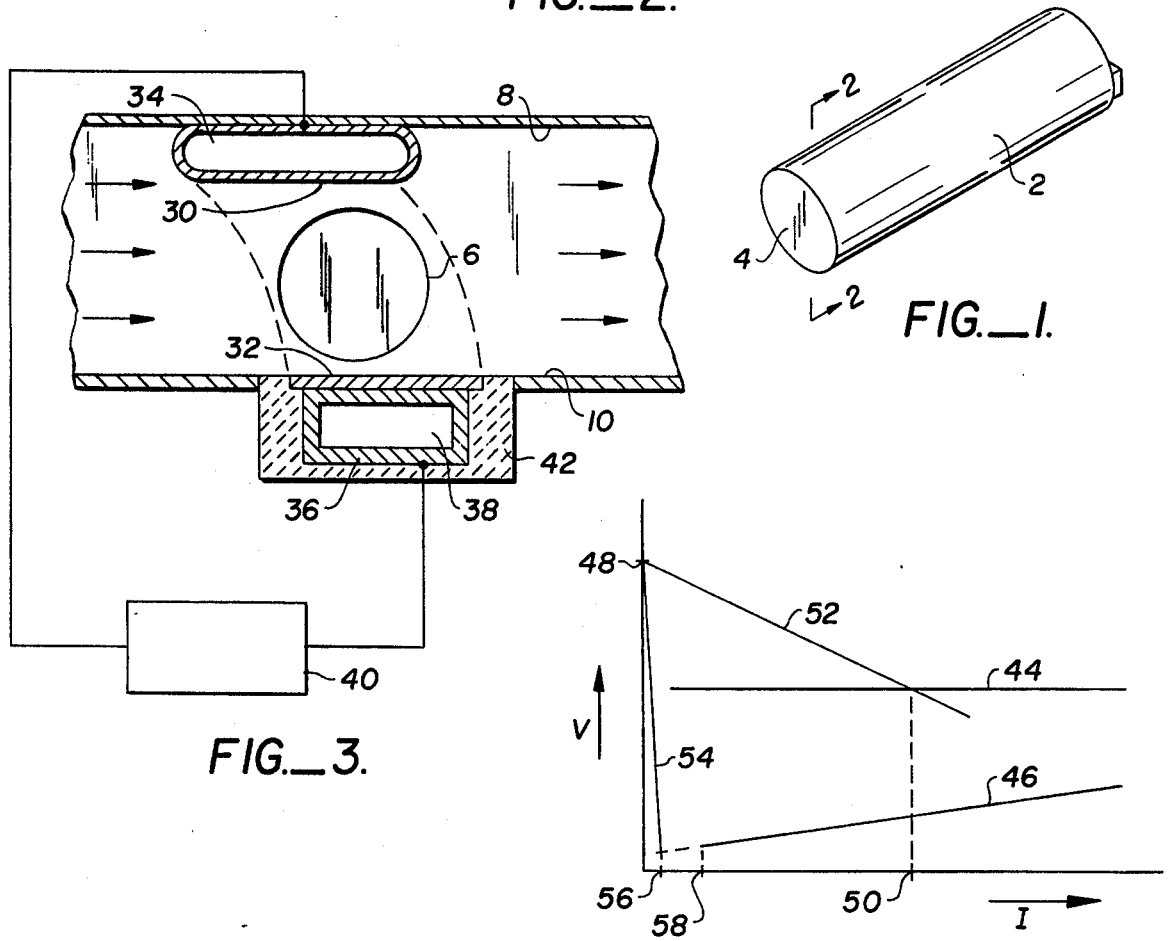

APPARATUS FOR PRODUCING AN ELECTRIC GLOW DISCHARGE IN A FLOWING GAS

BACKGROUND OF THE INVENTION

This invention relates to apparatus for producing electric discharges in flowing gas. More particularly, it relates to apparatus for producing an arcless glow discharge in such gas. Such glow discharges are used in high power lasers and are also finding increasing use in materials surface treatment operations using plasmas.

In high power apparatus the flow of the gas mixture used therein permits the operation of a glow discharge at high input powers without excessive temperature increases in the apparatus. In high power flowing gas lasers the apparatus generally includes a closed loop fluid path with the heated gas from the glow discharge being cooled by passage through a heat exchanger prior to recirculation through the discharge. In all such devices the basic problem confronted is the provision, at high input power, of the desirable broad and uniform glow discharge from constricting into a small hot arc. Various prior art techniques have been used to help control this arcing tendency. The most common prior art technique has been the utilization of a large number of individual electrodes, each having its own ballast resistor, such as described in Bridges, U.S. Pat. No. 3,577,096, Foster et al, U.S. Pat. No. 3,772,610 and Eckbreth et al, U.S. Pat. No. 3,777,279. In these prior art structures individually ballasted multiple electrodes have been used for cathodes, for anodes and for both electrodes together. However, these prior art devices suffer from the deficiency that individually ballast multiple electrode structures are both complicated to fabricate and assemble and are also generally unreliable and short-lived because of this complexity.

SUMMARY OF THE INVENTION

To overcome the above noted deficiencies of the prior art, it is an object of the present invention to provide glow discharge producing apparatus which will maintain a stable high power glow discharge in a flowing gas. It is another object of the invention to provide such apparatus for a high power glow discharge in a flowing gas which reduces the tendency of the discharge to constrict into an arc in the gas.

Briefly, the invention contemplates apparatus for producing an electric glow discharge in a flowing gas high power glow discharge device in which the gas is moved in a predetermined direction along a channel, with the electric glow discharge being in a direction generally transverse to the flow direction. This discharge producing apparatus includes a first electrode disposed adjacent a first wall of the flow channel and extending in a direction generally transverse to the flow and generally transverse to the direction of the electric discharge and a second, generally planar electrode disposed adjacent a second wall of the flow channel opposed to the first wall, this second electrode being formed of a material having a resistivity in the range of $10^2$ to $10^6$ ohm-centimeters and extending along the second wall generally opposite the cathode. Means are also provided for electrically energizing the first and second electrodes to establish a glow discharge to the flowing gas between the cathode and the anode.

The invention is based upon the discovery that an electrode made of a material having a resistivity intermediate that of conductors and insulators, e.g., a semiconductor, can be made to exhibit a circuit effect opposite to that of a constricting arc. Thus, the use of such electrode may serve to oppose formation of the arc. By the use of this invention a simple, one-piece mechanical construction for the electrode may be utilized to provide both reliability and long life to the electrode.

BRIEF DESCRIPTION OF THE DRAWINGS

A preferred embodiment of the apparatus of this invention will be discussed in detail in which:

FIG. 1 is a perspective view of a high power glow discharge device according to this invention;

FIG. 2 is an end sectional view of the apparatus of FIG. 1, shown at an enlarged scale;

FIG. 3 is a schematic representation at an enlarged scale of the glow discharge region structure of the apparatus of FIG. 2; and FIG. 4 is a graph generally illustrating the voltage/current characteristics of a glow discharge and an arc.

DESCRIPTION OF A PREFERRED EMBODIMENT

In one preferred embodiment of the present invention, illustrated in FIGS. 1 through 3, the apparatus of this invention is incorporated into a closed loop, recirculating, high power gas laser. An end sectional view of such a laser is illustrated in FIG. 2. In general, this glow discharge device comprises a chamber defined by an elongated housing 2 having a pair of opposed end portions 4 (only one of which is shown in this sectional view of FIG. 2). Each end portion 4 has mounted thereto a mirror 6, such mirrors being optically aligned and defining the resonant optical cavity for the laser.

A suitable gas or gas mixture, conveniently carbon dioxide ($CO_2$) is contained within the chamber defined by housing 2 and end portions 4. Such a gas, or mixture of gases, is that which provides for the lasing action. Within the gas containing chamber is defined a closed loop fluid path for recirculation of the gas within the chamber. This path is defined by baffles 8, 10, 12, and 14 and by turning vanes 16, 18, 20, 22, and 24. A transverse flow rotary fan 26, of the general type commonly described as a squirrel cage blower, is driven by a motor (not shown) and serves as the means for moving the gas around the fluid path in a generally clockwise direction in the illustration of FIG. 2. The turning vanes 22 and 24 direct the gas flow coming from the blower 26, and the vanes 16, 18 and 20 serve to direct the flow through the heat exchanger 28, which may suitably extend substantially the full longitudinal length of the chamber.

The glow discharge for this apparatus is maintained in a portion of the gas flow channel defined by baffles 8 and 10, illustrated at a larger scale in FIG. 3. More specifically, the glow discharge is maintained between a pair of electrodes 30 and 32. The first electrode 30, preferably the cathode in this embodiment, suitably comprises a hollow metallic member positioned flush with or adjacent baffle 8 in the stream of the gas flow. When the cathode is placed within the flow channel, as illustrated in FIGS. 2 and 3, it preferably is configured to have a large area surface generally facing the opposed wall 10 of the flow channel and preferably extends substantially the full length of the discharge device, such as the laser. It has been found desirable to provide this cathode with a gently changing topography, as illustrated by the flattened tube having gently curving end portions, in order to produce minimal electric field gradients between the cathode and its corresponding anode. By making the cathode 30 hollow, a coolant may be introduced into one end of the cathode to flow through the internal cavity 34 for extraction at the opposite end to control the temperature rise in the cathode occuring during the glow discharge.

The second electrode 32, preferably the anode in this embodiment of the apparatus, is preferably a planar structure positioned adjacent or flush with the opposed wall 10 of the flow channel, generally opposite the cathode, or first electrode 30, as illustrated in FIG. 3. This anode 32 comprises a member of semiconducting material having a resistivity in the range of $10^2$ to $10^6$ ohm-centimeters, typically in the sub-range of about $1 \times 10^4$ to $2 \times 10^4$ ohm-centimeters. The material from which this member 32 is fabricated may be any of a number of semiconducting materials having those properties. One material which has been successfully used is a mixture of 10 parts by volume of carbon powder, 56 parts by volume aluminum oxide ($Al_2O_3$) powder, and 24 parts by volume sodium silicate ($Na_2SiO_3$) solution. This material, after drying slowly for one week, exhibits a resistivity of about $2 \times 10^4$ ohm-centimeters. Other suitable material may comprise $Fe_2O_3$—TiO, NiO—$Li_2CO_3$, and other carbon mixtures, to name but a few known to those skilled in the art.

In this preferred embodiment the top surface of the member 32 is positioned flush with the wall 10 defining the flow channel and is the only electrical contact of the anode structure with the glow discharge. For cooling a metallic tubular element 36 suitably may be bonded to the back side of the member 32 by means of a known electrically and thermally conductive adhesive. Thus, in a manner similar to that described with respect to the cathode, a coolant may be directed through the cavity 38 of the tubular member 36 to remove heat from the anode structure. A suitable power supply 40 is connected with its negative terminal to the cathode 30 and its positive terminal to the anode 32, suitably connected to the tubular member 36. As illustrated in FIGS. 2 and 3, the anode structure may be mounted to the flow channel wall 10 by an insulating material 42, which typically may be a glass fiber reinforced synthetic resin or ceramic or other suitable material. For greatest efficiency, this anode structure preferably extends longitudinally of the glow discharge device substantially the full length of the cathode.

In FIGS. 2 and 3 it may be seen that the cathode 30 and anode 32 are positioned such that the glow discharge (indicated by the broken line) extend across the flow channel generally transverse to the gas flow direction (indicated by the arrows) and generally transverse to the longitudinal dimension of the cathode and anode. For a laser such as is illustrated in FIGS. 1 through 3, the area of the glow discharge and the laser cavity mirrors 6 are mutually positioned such that glow discharge extends across the optical path between the mirrors, thus to provide the energy for the lasing action. Obviously, for a high power glow discharge device other than a laser, such as is used for surface treatment of materials, there may be no requirement for such end mirror 6.

In the device illustrated, representing one suitable operational embodiment, the dimensions of the anode member 32 typically may be $2\frac{1}{4}$ inches wide (in the direction of the gas flow) by 44 inches long (longitudinally of the device) by about $\frac{1}{4}$ inch thick. Thus, the circuit resistance due to current flow from the power supply through the complete area of the anode may be about 10 to 20 ohms. Due to the resistivity characteristics of the anode material, any constriction of the discharge into an arc will greatly reduce the effective area of the anode. Due to the resistivity characteristics of the anode material, the result of such constriction is a dramatic increase in the resistance of the anode to several hundred thousand ohms. These characteristics may generally be represented in a graph, such as this shown in FIG. 4.

The graph of FIG. 4 represents the voltage current characteristics of the glow discharge and of an arc. For the apparatus illustrated in FIGS. 1 through 3 the glow discharge will have an essentially constant voltage characteristic of about 1,000 volts to 2,000 volts, as represented by line 44 on the graph. In contrast, an arc has a slightly positive resistance at much lower voltages, typically 50 volts to 500 volts, as represented by line 46, for the apparatus of FIGS. 1 through 3. For operation of this apparatus, the voltage of the power supply is initially set at some level 48 which is higher than the glow discharge voltage. The glow discharge will then operate at some current level 50 determined by the intersection of the power supply load line 52 with the glow discharge characteristic 44. This load line 52 represents the resistance through the semiconductor anode 32 over the area which the glow discharge occupies. If an arc forms, the area of contact with the anode 32 contracts, producing higher resistance. For a fully developed arc, the resistance may increase by a factor of about 10,000. The very steep load line 54 on the graph represents the resistance characteristics for the fully developed arc, intersecting the arc characteristic 46 at a current 56 which is below the minimum arc holding current 58.

During the formation of an arc between the cathode and anode, the collapse of the current conduction area in the gas transfers the discharge through a succession of characteristic curves between curves 44 and 46. When a semiconductor electrode such as anode 32 is used in the circuit, the conduction area collapse will cause the electrode load line to follow concurrently a succession of load line curves between the curves 52 and 54. The intersections of the discharge characteristics in the load lines will thus determine the instantaneous operating points of the glow discharge device, with these operating points uniformly shifting to lower currents. Arcs are basically thermally produced, because hot plasma has a lower resistance which increases current density in the center of the discharge, causing more heating and continuing the collapse of the discharge area. By inclusion of a semiconductor electrode such as anode 32 in the circuit the current flowing in the discharge is reduced as an arc starts, since the resistance is increased by the reduced area. Thus, the arc is inherently deprived of the thermal energy required to continue the collapse of the discharge area and thus the formation of the arc. As a result of the present invention, such arcs therefore will not form and the more desirable broad area glow discharges may readily be maintained without the requirement for complex ballasted multiple electrodes. Thus may be provided a simple and reliable electrode structure for maintaining a stable high power glow discharge in a flowing gas.

While one suitable embodiment of the glow discharge producing apparatus of this invention has been described in detail above, it is to be understood that this description is illustrative only of the principles of the invention and is not to be considered limitative thereof. Obviously, numerous variations and modifications to this structure, all within the scope of this invention, will readily become apparent to those skilled in the art. Such variations and modifications are not limited to laser structures but may include numerous other forms of high power glow discharge devices in which such a semiconductor electrode is used. Accordingly, the scope of this invention is to be construed solely with respect to the claims appended hereto.

What is claimed is:

1. In a flowing gas high power glow discharge device in which a gas is moved in a predetermined direction along a channel where an electric glow discharge is maintained, apparatus for producing an electric glow discharge in said flowing gas in a direction generally transverse to said flow direction, comprising a first electrode disposed adjacent a first wall of said flow channel and extending in a direction generally transverse to said flow and generally transverse to the direction of said electric discharge, a generally planar second electrode disposed adjacent a second wall of said flow channel opposed to said first wall, said second electrode being formed of a material having a resistivity in the range of $10^2$ to $10^6$ ohm-centimeters and extending along said second wall generally opposite said first electrode, and means for electrically energizing said first and second electrodes to establish a glow discharge through said flowing gas between said first and second electrodes.

2. Apparatus according to claim 1 wherein said first electrode comprises a cathode and said second electrode comprises an anode.

3. Apparatus according to claim 1 wherein said second electrode is imbedded generally flush with the gas-contacting portion of said channel second wall.

4. Apparatus according to claim 1 wherein said first electrode extends across substantially the full width of said flow channel transverse to said direction of gas flow.

5. Apparatus according to claim 1 wherein said second electrode extends opposite substantially the full length of said first electrode.

6. Apparatus according to claim 1 wherein said second electrode material has a resistivity in the range of $1 \times 10^4$ ohm-centimeters to $2 \times 10^4$ ohm-centimeters.

7. Apparatus according to claim 1 wherein said second electrode includes a cavity extending internally thereof along its length, whereby a coolant may be circulated through the second electrode.

8. Apparatus according to claim 1 wherein said glow discharge device is a gas laser having an internal, closed loop fluid path, and wherein said flow channel comprises a portion of said fluid path.

9. Apparatus according to claim 1 wherein said second electrode material is formed from a mixture of carbon, aluminum oxide and sodium silicate.

* * * * *